(12) United States Patent
Cordingley et al.

(10) Patent No.: US 6,181,728 B1
(45) Date of Patent: Jan. 30, 2001

(54) CONTROLLING LASER POLARIZATION

(75) Inventors: James J. Cordingley, Littleton; Donald V. Smart, Boston; Michael Plotkin, Newton; William Lauer, Westford, all of MA (US)

(73) Assignee: General Scanning, Inc., Wilmington, MA (US)

( * ) Notice: Under 35 U.S.C. 154(b), the term of this patent shall be extended for 0 days.

(21) Appl. No.: 09/109,482

(22) Filed: Jul. 2, 1998

(51) Int. Cl.[7] ................................. H01S 3/10; H01S 3/08
(52) U.S. Cl. ............................ 372/106; 372/26; 372/27; 372/107
(58) Field of Search ..................... 372/106, 107, 372/27, 26

(56) References Cited

U.S. PATENT DOCUMENTS

| | | |
|---|---|---|
| 4,462,150 | 7/1984 | Nishimura et al. . |
| 4,494,220 | 1/1985 | Dumbri et al. . |
| 4,658,379 | 4/1987 | Fujishima et al. . |
| 4,724,422 | 2/1988 | Golab . |
| 4,795,720 | 1/1989 | Kawanabe et al. . |
| 4,839,864 | 6/1989 | Fujishima . |
| 4,847,810 | 7/1989 | Tagami . |
| 5,022,034 * | 6/1991 | May et al. .............................. 372/26 |
| 5,025,300 | 6/1991 | Billig et al. . |
| 5,057,664 * | 10/1991 | Johnson et al. .................. 219/121.69 |
| 5,172,391 * | 12/1992 | Zayhowski ............................ 372/106 |
| 5,185,753 * | 2/1993 | Benda et al. ............................ 372/27 |
| 5,204,836 | 4/1993 | Reed . |
| 5,241,212 | 8/1993 | Motonami et al. . |
| 5,255,217 | 10/1993 | Tan . |
| 5,270,976 | 12/1993 | Tran . |
| 5,325,334 | 6/1994 | Roh et al. . |
| 5,471,427 | 11/1995 | Murakami et al. . |
| 5,808,768 | 9/1998 | Tadakuma et al. .................. 359/156 |

OTHER PUBLICATIONS

Robert T. Smith et al., "Laser Programmable Redundancy and Yield Improvement in a 64K DRAM", IEEE Journal of Solid–State Circuits, vol. SC–16, No. 5, Oct. 1981, pp. 506–513.

* cited by examiner

Primary Examiner—Frank G. Font
Assistant Examiner—Armando Rodriguez
(74) Attorney, Agent, or Firm—Fish & Richardson P.C.

(57) ABSTRACT

A laser polarization control apparatus includes a polarization modifying device, such as a liquid crystal variable retarder, and a controller. The polarization modifying device receives a laser beam and modifies the polarization of the laser beam. The controller, which is connected to the polarization modifying device, adjusts an input to the polarization modifying device in order to control modification of the polarization of the laser beam based on alignment of a structure to be processed by the laser beam. For example, the polarization of the laser beam may be rotated to correspond with the alignment of a link in a semiconductor device to be cut by the laser beam. The polarization modifying device is configured for incorporation into a laser processing system that produces the laser beam received by the polarization modifying device and that focuses the laser beam modified by the polarization modifying device onto a workpiece that includes the structure to be processed by the laser beam. An analyzer tool receives the laser beam modified by the polarization modification device and measures the modification of the polarization of the laser beam by the polarization modification device.

50 Claims, 4 Drawing Sheets

CONTROLLING LASER POLARIZATION

BACKGROUND OF THE INVENTION

The present invention relates in general to laser processing of workpieces such as semiconductor devices and more particularly concerns processing of DRAMS, memories, and programmable devices by cutting fuses or links.

Laser systems have been used for many years in the fabrication of DRAMS and programmable devices. In DRAM production, for example, redundant memory is programmed by using a focused laser beam to cut fuses or links in the memory in order to replace defective memory cells. The programming is accomplished by disconnecting the fuses or links using a laser pulse generated by a diode pumped Q-switched YAG (or YLF) laser.

Recent semiconductor devices have link geometries typically about 1 $\mu$m wide by 5 $\mu$m long. These links may be located in groups of horizontally aligned links and vertically aligned links. A laser having 3–5 $\mu$m laser spot size may be used to disconnect such a link using a single laser pulse. By appropriately selecting the laser energy, the spot size, the laser pulse width, and the wavelength of the laser beam, it is possible to optimize laser parameters in order to achieve the cleanest and most reliable link disconnect.

The quality of a link disconnect may be evaluated by visually inspecting the blasted link. One measure of practicality in fuse or link disconnect is the energy cutting range or "energy window," which is the range of energies per pulse over which clean and reliable link cutting can be achieved. The laser energy that is used to process a semiconductor device can be set at the center of the predicted energy window, which may differ somewhat from the actual energy window due to process variations such as the thickness of the link material, the thickness of oxide material located on top of the link, laser instability, errors in the positioning of the laser beam, and focusing errors.

Many diode-pumped solid-state lasers used in laser processing systems are linearly polarized. Certain laser processing systems use circularly polarized laser beams rather than linear polarized laser beams.

SUMMARY OF THE INVENTION

One aspect of the invention features a laser polarization control apparatus that includes a polarization modifying device, such as a liquid crystal variable retarder, and a controller. The polarization modifying device receives a laser beam and modifies the polarization of the laser beam. The controller, which is connected to the polarization modifying device, adjusts an input to the polarization modifying device in order to control modification of the polarization of the laser beam based on alignment of a structure to be processed by the laser beam. For example, the polarization of the laser beam may be rotated to correspond with the alignment of a link in a semiconductor device to be cut by the laser beam. The polarization modifying device is configured for incorporation into a laser processing system that produces the laser beam received by the polarization modifying device and that focuses the laser beam modified by the polarization modifying device onto a workpiece that includes the structure to be processed by the laser beam.

Thus, according to the invention, a linearly or elliptically polarized laser beam may be aligned with a link to be cut. For example, the polarization of the laser beam may be vertically aligned when the link is aligned vertically and may be horizontally aligned when the link is aligned horizontally. It has been discovered that by utilizing this technique it is possible to increase the range of acceptable cutting energies that are effective for cutting certain types of links. This range of acceptable cutting energies is the energy window. Thus, by switching the polarization of the laser beam depending on the link orientation, the best results are obtained in terms of maximizing the width of the energy window. There may also be certain types of links for which the energy window is maximized when a linearly polarized laser beam is aligned perpendicularly to the link, or at some other angle, rather than parallel to the link.

Another aspect of the invention features an analyzer tool that receives the laser beam modified by the polarization modification device. The analyzer tool measures the modification of the polarization of the laser beam by the polarization modification device. A plurality of inputs are applied to the polarization modifying device to control modification of the polarization of the laser beam, and the laser beam modified by the polarization modification device is analyzed using the analyzer tool in order to measure modification of the polarization of the laser beam by the polarization modification device. The relationship between the inputs to the polarization control device and the modification of the polarization of the laser beam is stored. When the laser system is used to process a structure, the polarization modification device may modify polarization of the laser beam based on this stored relationship.

By applying a variety of inputs to the polarization modification device and by analyzing the laser beam modified by the polarization modification device, it is possible to identify the appropriate inputs required to obtain vertical linear polarization and horizontal linear polarization, for example. These inputs can then be stored for later use when the laser system processes links on a semiconductor device, so that the appropriate inputs can be applied to the polarization modification device to ensure that the polarization of the laser beam will be vertically aligned when the link is aligned vertically and horizontally aligned when the link is aligned horizontally.

Numerous other features, objects, and advantages of the invention will become apparent from the following detailed description when read in connection with the accompanying drawings.

DETAILED DESCRIPTION

Figure 1:
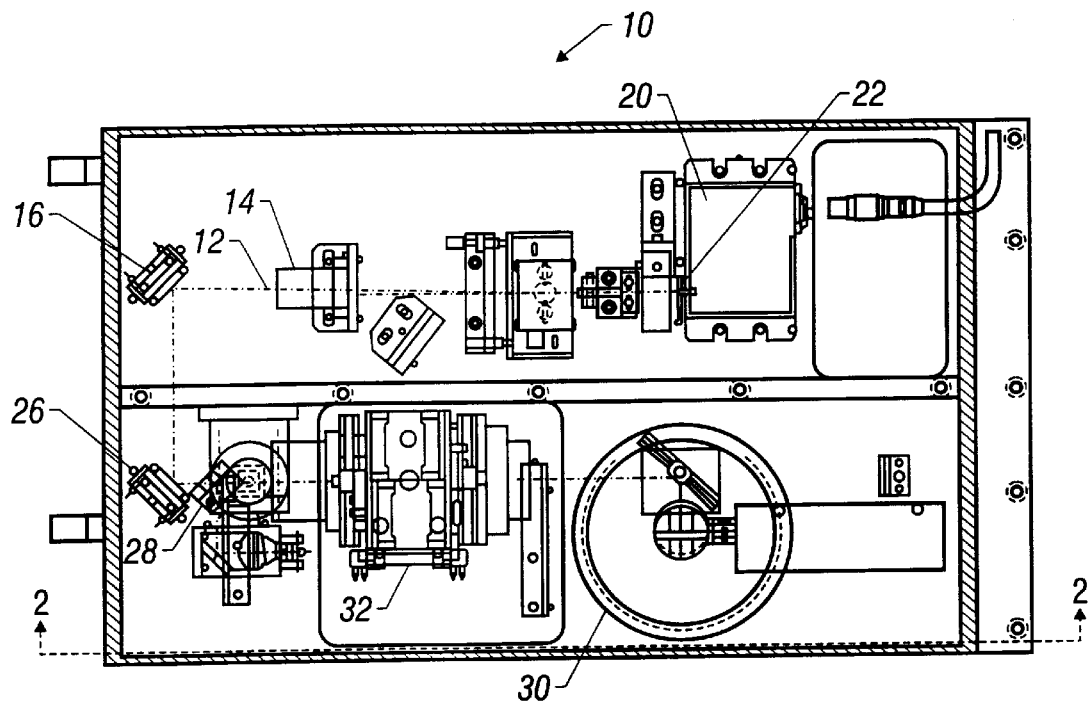
FIG. 1 is a horizontal cross-sectional view of a laser system according to the invention prior to installation of a liquid crystal variable retarder and a polarizing beamsplitter.

According to the polarization control concept described below, a linearly or elliptically polarized laser beam is aligned with a link to be cut in order to increase the energy window of a laser processing system. Because the invention provides a broad range of energies over which a given link can be cut well, the invention increases the likelihood of successful disconnection of the link despite known or unknown process parameters that tend to affect the processing of the link and therefore affect the optimal cutting energy. These process parameters can include, for example, the uncertainty in the thickness of an oxide layer over the link material, slight misalignments of the link with the laser beam due to positioning errors, instability of the laser pulse or of the laser pulse energy, focus errors, and uncertainty as to the thickness of the link.

For example, if there is a very thin oxide layer over a particular link it takes a very small amount of energy to cut that oxide layer. If, on the hand there is a very thick oxide layer over the link, then a large amount of energy will be required in order to cut the oxide layer.

For a particular type of link on a particular semiconductor device, the laser energy that is to be used to cut the link is set based on an experimental determination of the center of the predicted energy window for the particular type of link. For example, certain semiconductor wafers may have a thick oxide layer while others may have a thin oxide layer or no oxide layer. The customer may perform an experimental energy study on different types of wafers in order to determine the predicted energy window for a thin wafer and the predicted energy window for a thicker wafer, which will typically cover a higher energy range. Also, in a given semiconductor wafer containing semiconductor devices to be processed there could be various different types of links that require different energies to be optically cut. At the edges of the wafer, for example, there may be processing considerations from which it is experimentally determined that the center of the predicted energy window should be different as compared with other regions of the wafer.

It is not possible, however, to know with certainty the actual energy window for each given individual link (as opposed to the predicted energy window that includes the preselected laser energy) because of possible positioning errors, focus problems, uncertainty as to link thickness, uncertainty as to oxide thickness, instability of the laser, etc. Nevertheless, because the invention provides a wide range of energies that are effective for cutting a given link, the preselected laser energy is likely to fall within this wide range for the given link, because the actual energy window is very likely to overlap the preselected laser energy. For this reason, the large energy cutting range provided by the invention is very useful for maintaining reliable link cutting.

Because the invention utilizes a linearly or elliptically polarized laser beam rather than a circularly polarized laser beam, it is possible to align the polarization of the laser beam with the link and thereby optimize the actual energy window. On the other hand, if the laser beam used to cut a particular link is circularly polarized, the actual energy window may, at least under certain circumstances, be larger than it would be if the same laser beam were linearly or elliptically polarized and aligned perpendicularly to the link.

Thus, certain laser systems according to the invention can allow the user to select a circularly polarized laser beam as a compromise option if the user does not wish to go through the process of ensuring that a linearly or elliptically polarized laser beam is aligned with the link. It is believed that the largest energy windows can be achieved by aligning a linearly polarized beam with the link to be cut.

Figure 2:
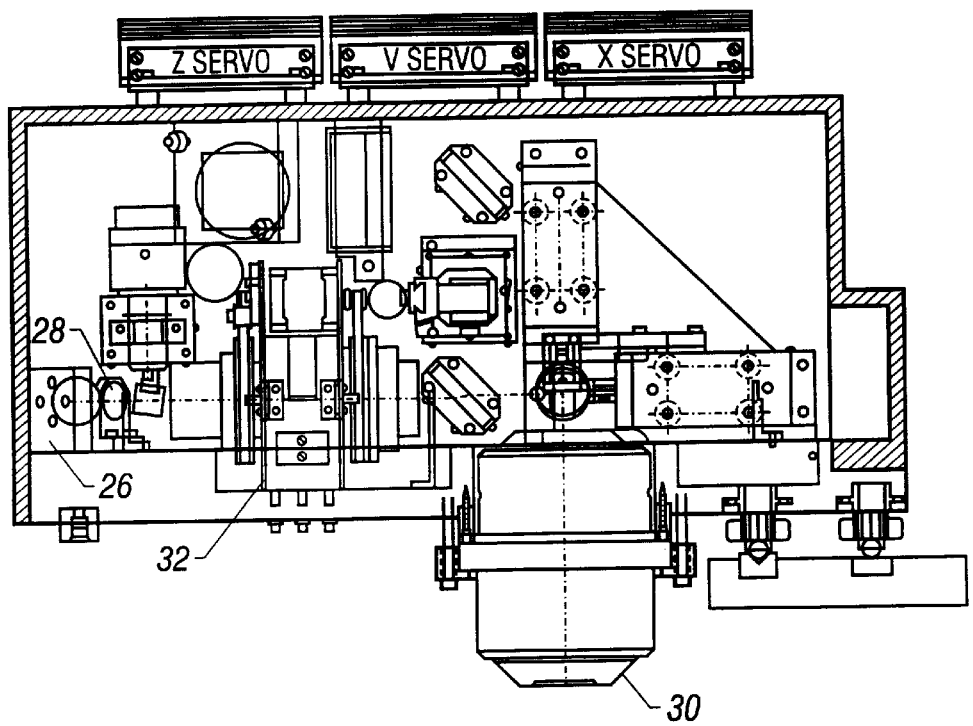
FIG. 2 is a vertical cross-sectional view of the laser system of FIG. 1 taken along line 2—2 in FIG. 1.
Figure 4:
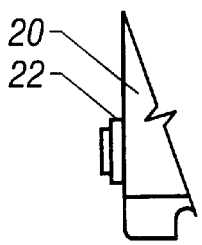
FIG. 4 is a detailed drawing of the laser head and the rotatable halfwave plate of the laser system of FIG. 1.

FIGS. 1 and 2 show the major components of a laser system 10 according to the invention, prior to installation of a liquid crystal variable retarder and a polarizing beamsplitter that are used to adjust linear polarization based on the alignment of a link to be cut. Diode-pumped Q-switched laser head 20 produces a laser beam 12, shown by a dashed line, that passes through halfwave plate 22 (see the detail shown in FIG. 4) that causes the laser beam to be linearly polarized. Laser beam 12 proceeds through small pre-expander telescope assembly 14, which may, for example, expand the laser beam about three times, and then laser beam 12 reflects off of rear turning mirror 16, taking a 90-degree turn. Laser beam 12 reflects off of front turning mirror 26 and proceeds through beamsplitter 28 and telescope assembly 32 toward scan lens 30, which includes galvanometers 34 and 36 that direct laser beam 12 toward a work surface.

Figure 3:
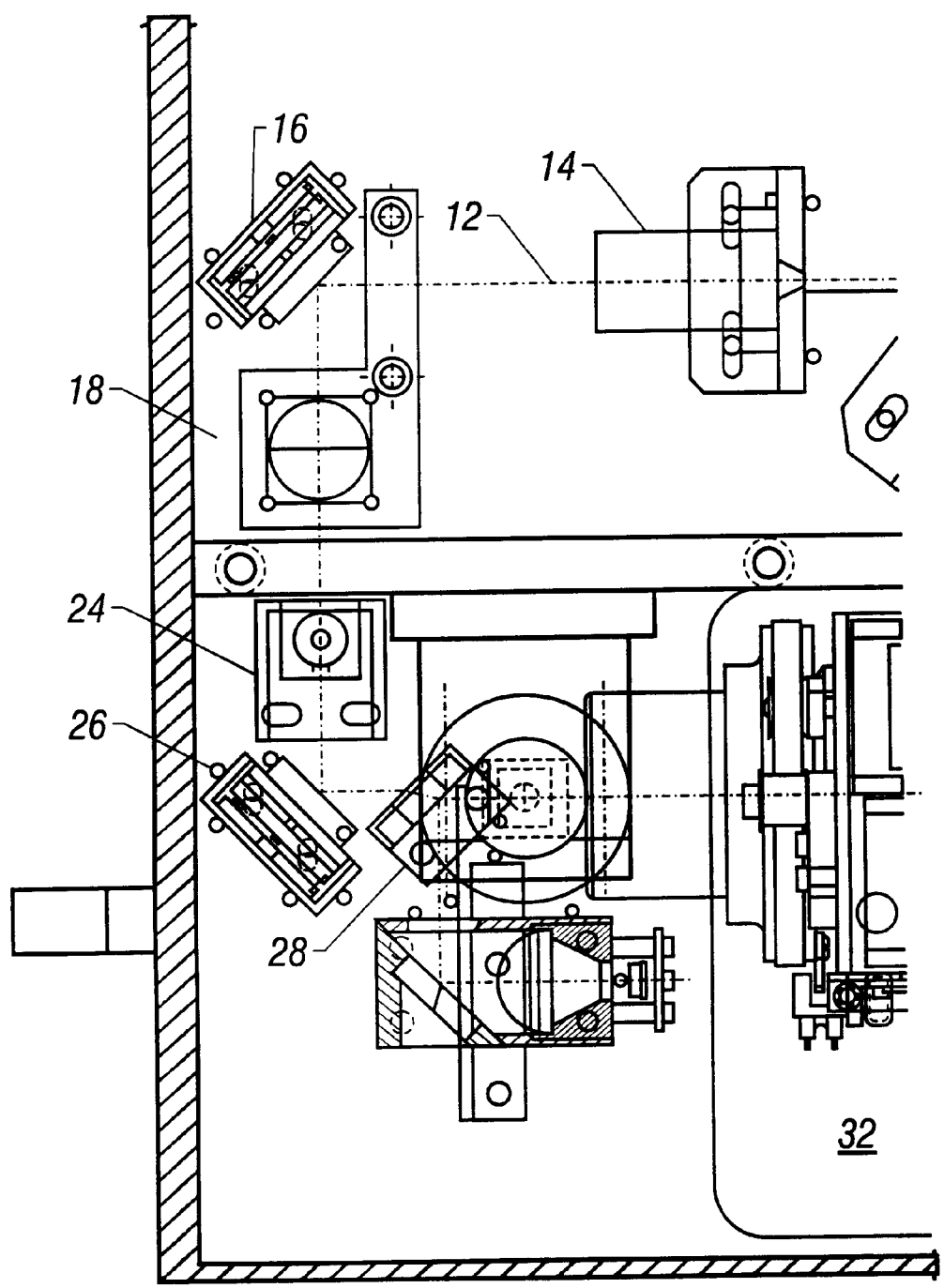
FIG. 3 is a horizontal cross-sectional view of a portion of the laser system of FIG. 1 after installation of the liquid crystal variable retarder and the polarizing beamsplitter.

Referring to FIG. 3, which shows the laser system 10 of FIGS. 1 and 2 after installation of a liquid crystal variable retarder 24 and a polarizing beamsplitter 18, after laser beam 12 reflects off of rear turning mirror 16, it proceeds through polarizing beamsplitter assembly 18, which dumps a portion of the energy of the laser beam (in order to obtain stable, short pulses, the laser may be operated at maximum power, with the laser rod being pumped as hard as possible). Polarizing beamsplitter assembly 18 dumps the horizontally polarized portion of laser beam 12 and allows vertically polarized portions of laser beam 12 to be transmitted through it. Laser beam 12 itself is linearly polarized prior to entering polarizing beamsplitter assembly 18, and so by rotating half wave plate 22 it is possible to control the percentage of laser beam 12 that is dumped by polarizing beamsplitter assembly 18, so that polarizing beamsplitter assembly 18 in effect functions as a variable beamsplitter. Laser beam 12 coming out of polarizing beamsplitter assembly 18 is always vertically polarized.

A voltage-controlled liquid crystal variable retarder (LCVR) and mount 24, provided according to the invention, includes a birefringent liquid crystal sandwiched between two plates. As is known in the art, the birefringent liquid crystal can rotate the polarization of a laser beam, because light moves at different speeds along different axes through the birefringent liquid crystal, resulting in a phase shift of the polarization. Moreover, the birefringent liquid crystal can also transform the linearly polarized laser input into an elliptically or circularly polarized laser output. Laser beam 12 maintains its polarization as it travels from LCVR 24 to the work surface. No other optics external to laser system 10 are required in order to change the polarization of laser beam 12.

Figure 5:
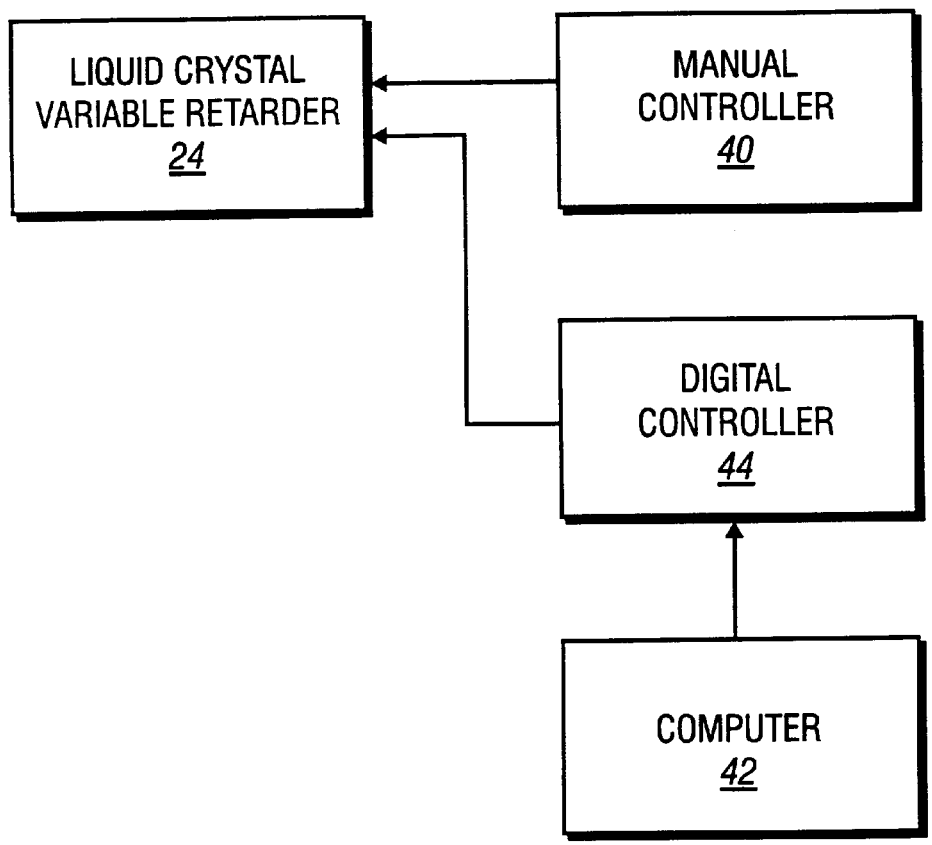
FIG. 5 is a block diagram of the components of a system that controls the voltage applied to the liquid crystal variable retarder of the laser system of FIG. 1.

With reference to FIG. 5, the voltage applied to liquid crystal variable retarder 24 is controlled by a digital controller 44 and/or a manual controller 40, which interface with liquid crystal variable retarder 24 through a cable that passes through a cable port of the laser system shown in FIG. 1. Manual controller 40 can be adjusted by a user in order to vary the voltage to LCVR 24, based on the user's knowledge of whether a link to be destroyed is vertical or horizontal, for example. Digital controller 44 receives input from computer 42 in order to automatically vary the voltage to LCVR 24 based on information stored in computer 42 pertaining to the alignment of the links to be cut. This input from computer 42 controls digital controller 44 so as to cause an appropriate voltage to be applied to LCVR 24. The correct voltages to achieve horizontal polarization, vertical polarization, circular polarization, etc. can be determined experimentally. In one embodiment, digital controller 44 is programmed to select among three different voltages corresponding to vertical linear polarization, horizontal linear polarization, and circular polarization. In other embodiments digital controller 44 stores sixty-four or ninety-six different voltages, including voltages corresponding to various elliptical polarizations. Other embodiments are also possible in which the liquid crystal variable retarder is capable of rotating linear polarization to numerous angles other than the vertical or the horizontal, in the event that polarization at such angles proves useful for cutting certain types of structures.

Figure 6:
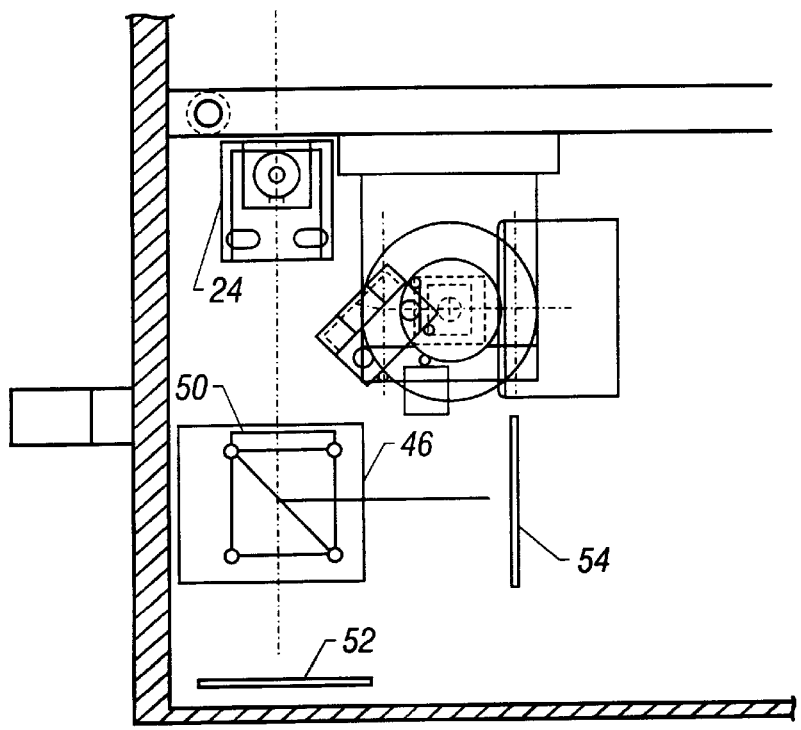
FIG. 6 is a horizontal cross-sectional view of a portion of the laser system of FIG. 1 after installation of a liquid crystal variable retarder and a polarizing beamsplitter analyzer tool to determine experimentally the appropriate voltages to apply to the liquid crystal variable retarder to provide a circularly polarized laser beam output.

With reference to FIG. 6, in order to determine experimentally the appropriate voltages to apply to LCVR 24 to provide a circularly polarized laser beam output, the front turning mirror 26 (FIG. 3) is removed from the laser system, so that laser beam 12 continues toward a polarizing beamsplitter analyzer tool 46 that is inserted into the laser system. Polarizing beamsplitter analyzer tool 46, which is used to analyze the polarization of laser beam 12 after it passes through LCVR 24, includes polarizing beamsplitter 48 having a quarter wave plate 50 positioned in front of it. Quarter wave plate 50 linearizes any circularly polarized light received from LCVR 24, so that when this circularly polarized light goes to the polarizing beamsplitter it will be 100 percent transmitted or 100 percent reflected depending on its handedness. Detection plates 52 and 54 detect the amount of light that is transmitted through polarizing beamsplitter 48 and the amount of light reflected by polarizing beamsplitter 48, respectively. If the light received from LCVR 24 is not circularly polarized, however, but is instead elliptically polarized, then less than 100 percent of the light received from LCVR 24 will be transmitted or reflected. In this manner it is possible to determine whether a voltage that is applied to LCVR 24 is appropriate for yielding circular polarization.

Figure 7:
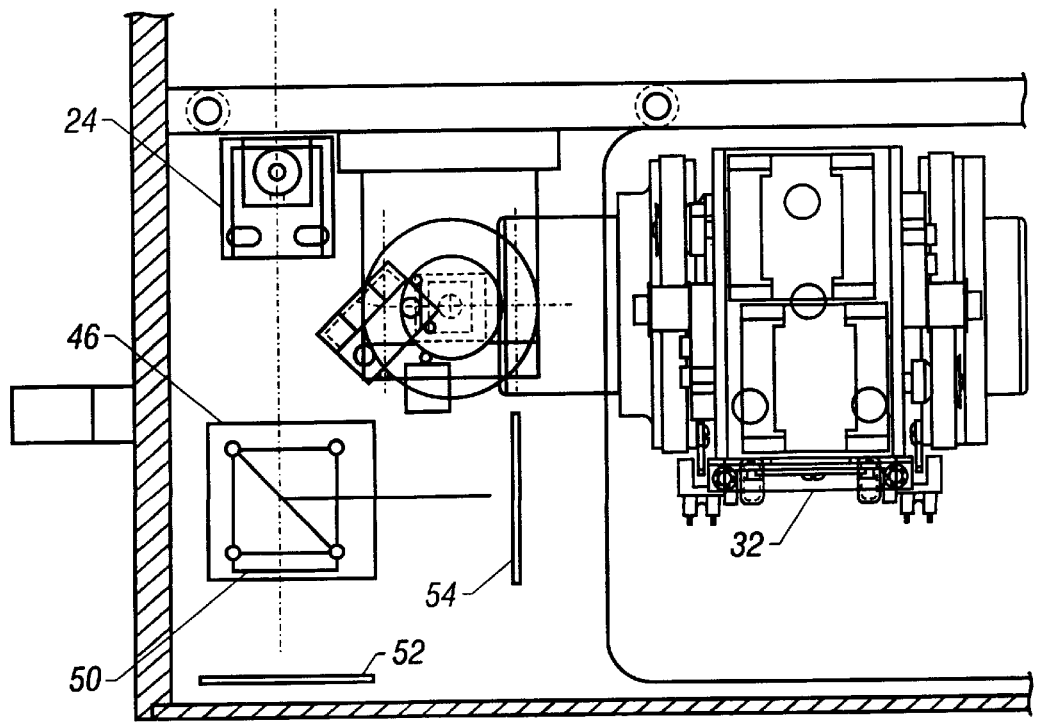
FIG. 7 is a horizontal cross-sectional view of a portion of the laser system of FIG. 1 after installation of a liquid crystal variable retarder and a polarizing beamsplitter analyzer tool to determine experimentally the appropriate voltages to apply to the liquid crystal variable retarder to provide a vertically or horizontally polarized laser beam output.

With reference to FIG. 7, in order to determine experimentally the appropriate voltages to apply to LCVR 24 to provide a vertically or horizontally polarized laser beam output, the orientation of beamsplitter analyzer tool 46 is flipped so that polarizing beamsplitter 48 is positioned in front of, rather than behind, quarter wave plate 50. In this orientation, quarter wave plate 50 does not perform any useful function because it simply converts linearly polarized light into circularly polarized light without changing the energy of the light that passes through it. If laser beam 12 is linearly polarized it should either be 100 percent transmitted through polarizing beamsplitter 48 or 100 percent reflected by polarizing beamsplitter 48, depending on whether laser beam 12 is vertically or horizontally polarized.

The procedures described above in connection with FIGS. 6 and 7 may be performed at the point of manufacture of the apparatus of FIG. 3, or at the point of installation of LCVR and mount 24 into an existing laser system in the case of an upgrade. After these procedures are performed, beamsplitter analyzer tool 46 should be removed from the laser system and the front turning mirror should be re-installed into the laser system. By applying a variety of voltages to LCVR 24 and observing the relative amounts of light detected by detection plates 52 and 54, it is possible to identify the appropriate voltage required to obtain vertical linear polarization, horizontal linear polarization, and circular polarization. These voltages can then be stored by computer 42 or digital controller 44 or can be recorded for use by a user of manual controller 40. A customer may program digital controller 44 to cause any arbitrary voltage to be applied to LCVR 24. For example, if a particular customer desires to identify a voltage that yields vertical elliptical polarization or horizontal elliptical polarization, the customer can find this voltage experimentally using the techniques described above in connection with FIGS. 6 and 7. The techniques described in connection with FIGS. 6 and 7 should be performed on an apparatus-by-apparatus basis because there may be some variation in the operation of LCVR 24 on an apparatus-by-apparatus basis and because different lasers may operate at different wavelengths, different voltages, and different polarizations. Thus, for example, if it were desired change the wavelength at which a particular laser system operates, it would be important to perform the experimentation procedures described above again.

It is possible to identify experimentally the energy window that can be achieved by aligning the linear or elliptical polarization of the laser beam with links. The laser system can be used to cut every other link in a bank of links (which may include thousands of links), with the polarization of the laser beam being aligned with each link, and with each link being cut at a slightly different energy. The links are then inspected to determine whether the links are cut cleanly, or whether the cut is ragged or material is blown out of the cutting area due to laser energy not being cleanly absorbed by the link. If the laser energy is too low the link will not be disconnected cleanly and if its much too low the link will not be disconnected at all. If the laser energy is too high, damage may occur to the substrate surrounding the link and to surrounding features such as other links. The links that are cleanly cut define the energy window.

By performing the same procedure with the linear or elliptical polarization of the laser beam being aligned perpendicular with each link, or with circular polarization of the laser beam, or any other possible polarization, it is possible to identify the energy window corresponding to these polarizations as well. It has been discovered, using these techniques, that the energy window can be increased by aligning a linearly polarized laser beam with the links to be cut.

There has been described novel and improved apparatus and techniques for laser processing of semiconductor devices. The invention is to be construed as embracing each and every novel feature and novel combination of features present in or possessed by the apparatus and techniques herein disclosed. It is also evident that those skilled in the art may now make numerous uses and modifications of and departures from the specific embodiments described herein without departing from the inventive concept.

What is claimed is:

1. A laser polarization control apparatus comprising:
   a polarization modifying device configured to receive a laser beam and to modify the polarization of the laser beam; and
   a controller, connected to the polarization modifying device, configured to adjust an input to the polarization modifying device in order to control modification of the polarization of the laser beam based on alignment of a structure to be processed by the laser beam;
   the polarization modifying device being configured for incorporation into a laser processing system that produces the laser beam received by the polarization modifying device and that focuses the laser beam modified by the polarization modifying device onto a workpiece that includes the structure to be processed by the laser beam;

wherein the controller is configured to adjust the input to the polarization modifying device so as to cause the polarization of the laser beam to be adjusted as a function of the alignment of the structure to be processed by the laser beam.

2. The laser polarization control apparatus of claim 1 wherein the polarization modifying device comprises a liquid crystal variable retarder.

3. The laser polarization control apparatus of claim 1 wherein the polarization modifying device is configured to modify the polarization of the laser beam by rotating the polarization of the laser beam.

4. A laser polarization control apparatus comprising:
a polarization modifying device configured to receive a laser beam and to modify the polarization of the laser beam; and
a controller, connected to the polarization modifying device, configured to adjust an input to the polarization modifying device in order to control modification of the polarization of the laser beam based on alignment of a structure to be processed by the laser beam;
the polarization modifying device being configured for incorporation into a laser processing system that produces the laser beam received by the polarization modifying device and that focuses the laser beam modified by the polarization modifying device onto a workpiece that includes the structure to be processed by the laser beam;
wherein the controller is configured to adjust the input to the polarization modifying device so as to cause the polarization of the laser beam to be rotated to correspond with the alignment of the structure to be processed by the laser beam.

5. The laser polarization control apparatus of claim 4 wherein the polarization modifying device is further configured to modify the polarization of the laser beam by transforming linear polarization into circular polarization.

6. The laser polarization control apparatus of claim 1 wherein the polarization modifying device is configured to modify the polarization of the laser beam by transforming linear polarization into elliptical polarization.

7. The laser polarization control apparatus of claim 1 wherein the polarization modifying device is configured to receive and modify a linearly polarized laser beam.

8. A laser polarization control apparatus comprising:
a polarization modifying device configured to receive a laser beam and to modify the polarization of the laser beam; and
a controller, connected to the polarization modifying device, configured to adjust an input to the polarization modifying device in order to control modification of the polarization of the laser beam based on alignment of a structure to be processed by the laser beam;
the polarization modifying device being configured for incorporation into a laser processing system that produces the laser beam received by the polarization modifying device and that focuses the laser beam modified by the polarization modifying device onto a workpiece that includes the structure to be processed by the laser beam;
the polarization modifying device being configured to receive and modify a linearly polarized laser beam;

the laser polarization control apparatus further comprising a polarizing beamsplitter arranged to process the laser beam to be received by the polarization modifying device to ensure that the laser beam is linearly polarized in a predetermined direction.

9. The laser polarization control apparatus of claim 1 wherein the input to the polarization modifying device comprises a voltage input.

10. The laser polarization control apparatus of claim 1 wherein the controller is a manually adjustable controller.

11. A laser polarization control apparatus comprising:
a polarization modifying device configured to receive a laser beam and to modify the polarization of the laser beam; and
a controller, connected to the polarization modifying device, configured to adjust an input to the polarization modifying device in order to control modification of the polarization of the laser beam based on alignment of a structure to be processed by the laser beam;
the polarization modifying device being configured for incorporation into a laser processing system that produces the laser beam received by the polarization modifying device and that focuses the laser beam modified by the polarization modifying device onto a workpiece that includes the structure to be processed by the laser beam;
the laser polarization control apparatus further comprising a processor programmed to control how the controller adjusts the input to the polarization modifying device, based on stored information specifying alignment of structures to be processed by the laser beam.

12. The laser polarization control apparatus of claim 1 wherein the laser processing system is configured for cutting links in a semiconductor device, and wherein the structure to be processed by the laser beam is a link.

13. A laser polarization control apparatus comprising:
a polarization modifying device configured to receive a laser beam and to modify the polarization of the laser beam; and
a controller, connected to the polarization modifying device, configured to adjust an input to the polarization modifying device in order to control modification of the polarization of the laser beam based on alignment of a structure to be processed by the laser beam;
the polarization modifying device being configured for incorporation into a laser processing system that produces the laser beam received by the polarization modifying device and that focuses the laser beam modified by the polarization modifying device onto a workpiece that includes the structure to be processed by the laser beam;
the laser polarization control apparatus further comprising an analyzer tool arranged to receive the laser beam modified by the polarization modification device, the analyzer tool being configured to measure the modification of the polarization of the laser beam by the polarization modification device.

14. The laser polarization control apparatus of claim 13 wherein the analyzer tool is removably insertable into the laser processing system.

15. A method of controlling laser polarization comprising:
providing a laser processing system that produces a laser beam and that focuses the laser beam onto a workpiece that includes a structure to be processed by the laser beam;
determining alignment of each of a plurality of structures to be processed by the laser beam;

modifying polarization of the laser beam based on the alignment of each of the structures to be processed by the laser beam; and processing the structures using the laser processing system by focusing the laser beam having a modified polarization onto the structures.

16. The method of claim 15 wherein the step of modifying the polarization of the laser beam comprises rotating the polarization of the laser beam.

17. The method of claim 16 wherein the step of rotating the polarization of the laser beam comprises causing the polarization of the laser beam to correspond with the alignment of the structure to be processed by the laser beam.

18. The method of claim 16 wherein the step of modifying the polarization of the laser beam produces a linearly polarized laser beam.

19. The method of claim 16 wherein the step of modifying the polarization of the laser beam produces an elliptically polarized laser beam.

20. The method of claim 15 wherein the laser processing system is configured for cutting links in a semiconductor device, and wherein the structure to be processed by the laser beam is a link.

21. A method of controlling laser polarization, comprising:

providing a laser processing system that produces a laser beam and that focuses the laser beam onto a workpiece that includes a structure to be processed by the laser beam;

providing, in the laser processing system, a polarization modifying device configured to receive the laser beam and to modify the polarization of the laser beam;

providing, in the laser processing system, an analyzer tool arranged to receive the laser beam modified by the polarization modification device, the analyzer tool being configured to measure the modification of the polarization of the laser beam by the polarization modification device;

applying a plurality of inputs to the polarization modifying device to control modification of the polarization of the laser beam;

analyzing the laser beam modified by the polarization modification device using the analyzer tool in order to measure modification of the polarization of the laser beam by the polarization modification device; and storing the relationship between the inputs to the polarization control device and the modification of the polarization of the laser beam.

22. The method of claim 21 further comprising:

determining alignment of each of a plurality of structures to be processed by the laser beam;

modifying polarization of the laser beam by applying an input to the polarization control device, based on the alignment of each of the structures to be processed by the laser beam and based on the stored relationship between inputs to the polarization control device and modification of the laser beam; and processing the structures using the laser processing system by focusing the laser beam having a modified polarization onto the structures.

23. The method of claim 22 wherein the laser processing system is configured for cutting links in a semiconductor device, and wherein the structure to be processed by the laser beam is a link.

24. The method of claim 21 wherein the modification of the polarization of the laser beam comprises rotation of the polarization of the laser beam.

25. The method of claim 21 wherein the modification of the polarization of the laser beam produces a linearly polarized laser beam.

26. The method of claim 21 wherein the modification of the polarization of the laser beam produces an elliptically polarized laser beam.

27. The method of claim 21 further comprising the step of removing the analyzer tool from the laser processing system.

28. The method of claim 21 wherein the step of storing the relationship comprises digital storing.

29. The method of claim 21 wherein the step of storing the relationship comprises manual storing.

30. The laser polarization control apparatus of claim 1 wherein the polarization modifying device is configured to modify the polarization of the laser beam by transforming the polarization into circular polarization.

31. The laser polarization control apparatus of claim 1 further comprising a analyzer tool arranged to receive the laser beam modified by the polarization modifying device, the analyzer tool being configured analyze the polarization of the laser beam.

32. The laser polarization control apparatus of claim 31 wherein the analyzer tool is removable from the laser processing system.

33. The laser polarization control apparatus of claim 31 wherein the analyzer tool is configured to analyze the polarization of the laser beam at a point of manufacture of the laser processing system.

34. The laser polarization control apparatus of claim 31 wherein the analyzer tool is configured to analyze the polarization of the laser beam at a point of installation of the polarization modifying device into the laser processing system.

35. The method of claim 15 wherein the step of modifying the polarization of the laser beam produces a circularly polarized laser beam.

36. The method of claim 15 further comprising the steps of providing, in the laser processing system, an analyzer tool arranged to receive the laser beam of modified polarization, the analyzer tool being configured to analyze the polarization of the laser beam.

37. The method of claim 36 further comprising the step of removing the analyzer tool from the laser processing system.

38. The method of claim 36, wherein the step of analyzing the polarization of the laser beam is performed at a point of manufacture of the laser processing system.

39. The method of claim 36 wherein the step of analyzing the polarization of the laser beam is performed at a point of installation of the polarization modifying device into the laser processing system.

40. The method of claim 21 wherein the modification of the polarization of the laser beam produces a circularly polarized laser beam.

41. The method of claim 21 wherein the step of measuring the modification of the polarization of the laser beam is performed at a point of manufacture of the laser processing system.

42. The method of claim 21 wherein the step of measuring the modification of the polarization of the laser beam is performed at a point of installation of the polarization modifying device into the laser processing system.

43. A method of laser processing of a structure comprising:

providing a structure to be processed;

providing a laser processing system that produces a polarized laser beam;

determining an orientation of the structure and the polarized laser beam relative to each other such that processing of the structure by the polarized laser beam occurs within a processing energy window that is larger than processing energy windows corresponding to at least some other orientations of the structure and the polarized laser beam relative to each other;

processing the structure by focusing the polarized laser beam onto the structure, the structure and the polarized laser beam being at the determined orientation relative to each other.

44. The method of claim 43 wherein the determined orientation is parallel with the polarized laser beam.

45. The method of claim 43 wherein the determined orientation is perpendicular to the polarized laser beam.

46. The method of claim 43 wherein the laser processing system is configured for cutting links in a semiconductor device, and wherein the structure to be processed by the laser beam is a link.

47. The method of claim 43 further comprising the steps of providing, in the laser processing system, an analyzer tool arranged to receive the polarized laser beam, the analyzer tool being configured to analyze the polarization of the laser beam.

48. The method of claim 47 further comprising the step of removing the analyzer tool from the laser processing system.

49. The method of claim 47 wherein the step of analyzing the polarization of the laser beam is performed at a point of manufacture of the laser processing system.

50. The method of claim 47 wherein the step of analyzing the polarization of the laser beam is performed at a point of installation of the polarization modifying device into the laser processing system.

* * * * *